United States Patent [19]
Liu et al.

[11] Patent Number: 6,100,934
[45] Date of Patent: Aug. 8, 2000

[54] APPARATUS AND METHOD TO CONVERT A NON-INTERLACED COMPUTER GRAPHICS SIGNAL TO AN INTERLACED VIDEO SIGNAL

[75] Inventors: Hsiung-Hao Liu, Hsinchu Hsien; Rong-Chuan Tsai, Hsinchu, both of Taiwan

[73] Assignee: Winbond Electronics Corporation, Taiwan

[21] Appl. No.: 09/002,579

[22] Filed: Jan. 5, 1998

[30]    Foreign Application Priority Data

Oct. 28, 1997 [TW] Taiwan .................................. 86115999

[51] Int. Cl.$^7$ .............................. H04N 7/01; H04N 11/20
[52] U.S. Cl. ............................................ 348/446; 348/447
[58] Field of Search ..................................... 348/446, 455, 348/441, 555, 453, 454, 607; 345/154; H04N 7/01, 11/20

[56]          References Cited

U.S. PATENT DOCUMENTS

| | | | |
|---|---|---|---|
| 5,136,385 | 8/1992 | Campbell | 348/607 |
| 5,455,628 | 10/1995 | Bishop | 348/446 |
| 5,793,433 | 8/1998 | Kim et al. | 348/445 |

*Primary Examiner*—Michael H. Lee
*Attorney, Agent, or Firm*—Fish & Richardson P.C.

[57]          ABSTRACT

An apparatus is disclosed to convert a non-interlaced computer graphics signal which consists of contiguous scan lines into an interlaced video signal which alternately consists of even fields and odd fields. The converting apparatus includes a receiving means, a low-pass filter and a line buffer. The receiving means sequentially receives a scan line. The line buffer stores the brightness signals of the first and the second scan lines before the received scan line. And the low-pass filter receives the sequential contiguous scan lines from the line buffer and the displaying scan line, weights the brightness signals of these scan lines and outputs the scan lines with the weighted brightness signal and a halved refresh rate to serve as the even field and the odd field of the interlace video signal.

13 Claims, 2 Drawing Sheets

APPARATUS AND METHOD TO CONVERT A NON-INTERLACED COMPUTER GRAPHICS SIGNAL TO AN INTERLACED VIDEO SIGNAL

FIELD OF THE INVENTION

The present invention relates in general to a converting apparatus and method, and in particular, to an apparatus and method for converting a non-interlaced computer graphics signal into an interlaced video signal.

BACKGROUND OF THE INVENTION

When a non-interlaced RGB graphics signal used in computer systems is applied to video applications, like a TV, the non-interlaced RGB graphics signal is first converted to an interlaced YUV graphics signal, since computer systems display graphics signals in noninterlaced format which consists of contiguous horizontal scan lines, while video applications display video signals in interlaced format which is alternately comprised of odd fields and even fields. Moreover, since the refresh rate of video applications is only 30 frames per second in the NTSC standard or 25 frames per second in the PAL standard, which is far less than the 60 or 50 frames per second refresh rate of computer systems, flicker also occurs at the vertical edges or places having large brightness variation of adjacent horizontal scan lines in the output images when applying noninterlaced computer graphics signals to video applications.

SUMMARY OF THE INVENTION

Since flicker is mostly caused by the brightness variation of adjacent horizontal scan lines, an object of the present invention is to provide a converting apparatus and method to eliminate flicker, which uses a low-pass filter smoothing the brightness signals of the horizontal scan lines and a line buffer(including a first line buffer and a second line buffer) storing the brightness signals of the adjacent horizontal scan lines(for example, a first and a second horizontal scan lines before the received horizontal scan line). In addition, since the present invention only handles the brightness signals of the received horizontal scan line and the adjacent horizontal scan lines, the line buffer can be a memory with a shortened 8-bit bus, effectively reducing the cost of hardware implementation. Furthermore, the weighting ratio used in the present invention can be stored in several registers and used to weight the brightness signals of the received horizontal scan line and the adjacent horizontal scan lines(the first and the second scan lines before the received horizontal scan line), so that the output images can be suitable for different occasions.

To achieve the above-indicated and other objects, the present invention provides an apparatus to convert a non-interlaced computer graphics signal to an interlaced video signal, wherein the non-interlaced computer graphics signal consists of contiguous horizontal scan lines, and the interlaced video signal alternately consists of odd fields and even fields. The converting apparatus includes a receiving means which sequentially receives a horizontal scan line, a low-pass filter and a line buffer (including a first line buffer and a second line buffer) which stores the brightness signals of two adjacent horizontal scan lines (such as the first and the second horizontal scan lines before the received non-interlaced computer graphics scan line). The lowpass filter receives the sequential contiguous horizontal scan line from the line buffer and the displaying (received) horizontal scan line of the non-interlaced computer graphics signal according to a display control signal, weights the brightness signal of these horizontal scan lines according to a weighting ratio, such as 1:2:1 or 1:1:1, and outputs these horizontal scan lines with weighted brightness signal and halved refresh rate to alternately serve as the even field and the odd field of the interlace video signal.

Furthermore, the line buffer can be a memory with an 8-bit bus for only storing the brightness signals of the first and the second horizontal scan lines before the received horizontal scan line.

In addition, the present invention also provides a method to convert a non-interlaced computer graphics signal into an interlaced video signal. First, a receiving means is provided to sequentially receive a horizontal scan line. Next, the brightness signals of the adjacent horizontal scan lines (such as the first and the second horizontal scan lines before the received horizontal scan line) are stored in a line buffer. Then, a low-pass filter is provided to sequentially receive the brightness signals of the contiguous horizontal scan lines from the line buffer and the displaying horizontal scan line of the non-interlaced computer graphics signal, weight the brightness signals of these horizontal scan lines based on a display control signal of the display controller and a weighting ratio, and output these horizontal scan lines with weighed brightness signal and halved refresh rate to alternately serve as an even field and an odd field of the interlace video signal.

Furthermore, the display control signal can be provided by a display controller. The weighting ratio can be stored in several registers and can be 1:2:1 or 1:1:1. And, the non-interlaced computer graphics signal is RGB format, which is converted to a YUV format noninterlaced computer graphics signal with the Y-signal representing brightness before sending to the line buffer and the low pass filter.

BRIEF DESCRIPTION OF THE DRAWINGS

The following detailed description, given by way of example and not intended to limit the invention solely to the embodiments described herein, will best be understood in conjunction with the accompanying drawings, in which.

DESCRIPTION OF THE PREFERRED EMBODIMENT

Embodiment

Figure 1B:
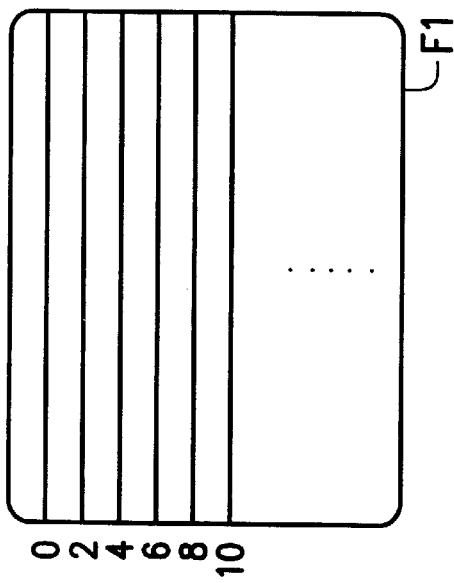
FIG. 1B (prior art) shows the format of an interlaced YUV video signal used in video applications.
Figure 1A:
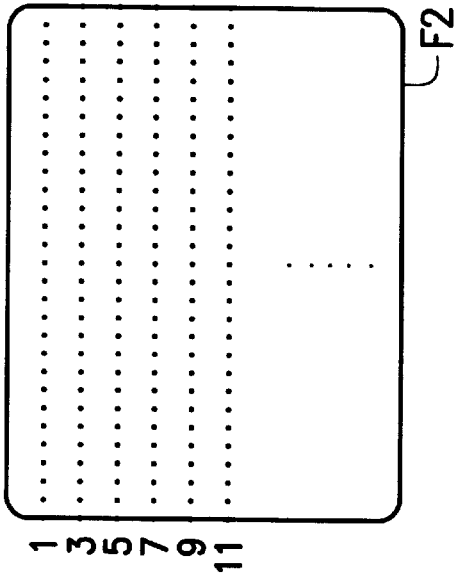
FIG. 1A (prior art) shows the format of a non-interlaced RGB graphics signal used in computer systems.
Figure 1A:
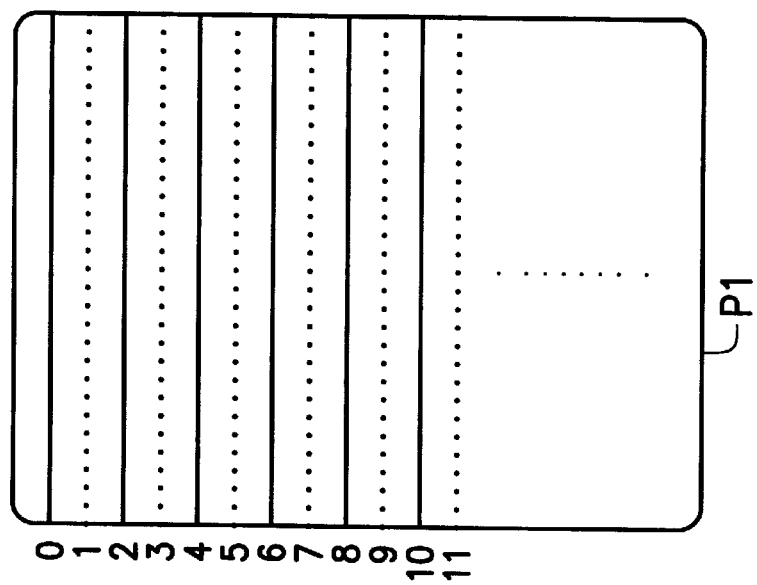

FIG. 1A (prior art) shows the format of a non-interlaced RGB graphics signal used in computer systems, wherein the non-interlaced computer graphics signal consists of contiguous frames with each frame (as labeled P1) including adjacent horizontal scan lines (as labeled 0, 1, 2, 3 etc.) and each horizontal scan line including a plurality of pixels (not shown) respectively displayed in RGB format in which the R-signal, G-signal and B-signal are each represented by an 8-bit value.

FIG. 1B (prior art) shows the format of an interlaced YUV graphics signal used in video applications, wherein the interlaced YUV video signal also consists of contiguous frames with each frame including a plurality of horizontal scan lines and each horizontal scan line including a plurality of pixels (not shown) displayed in YUV format, in which the Y-signal, U-signal and V-signal are each represented by an 8-bit value. However, the interlaced YUV signal is different from the non-interlaced RGB graphics signal because the interlaced YUV video signal alternately consists of an odd field and an even field (as labeled F2 and F1) each represents a frame, and the brightness signals of the horizontal scan lines of the interlaced YUV signal are represented by Y-signal, which is an 8 bit value. Therefore, when a field, i.e. an odd field F2 consists of odd horizontal scan lines in a frame of the non-interlaced computer graphics signal, the next field, i.e. even field F1 consists of even horizontal scan lines in the next frame of the non-interlaced computer graphics signal. Further, the numbers labeled in even field F1 and odd field F2 of FIG. 1B correspond to those in FIG. 1A.

The present invention intends to provide an apparatus and method for converting a non-interlaced computer graphics signal into an interlaced video signal, wherein the non-interlaced computer graphics signal is composed of contiguous horizontal scan lines and the interlaced video signal alternately consists an even field and an odd field.

Since large brightness variation is the primary cause of flicker in the converting apparatus and method of the present invention, the non-interlaced computer graphics signal is passed through a low-pass filter to reduce the brightness variation and to smooth the output images at the vertical edges and places with large brightness variations.

Figure 2:
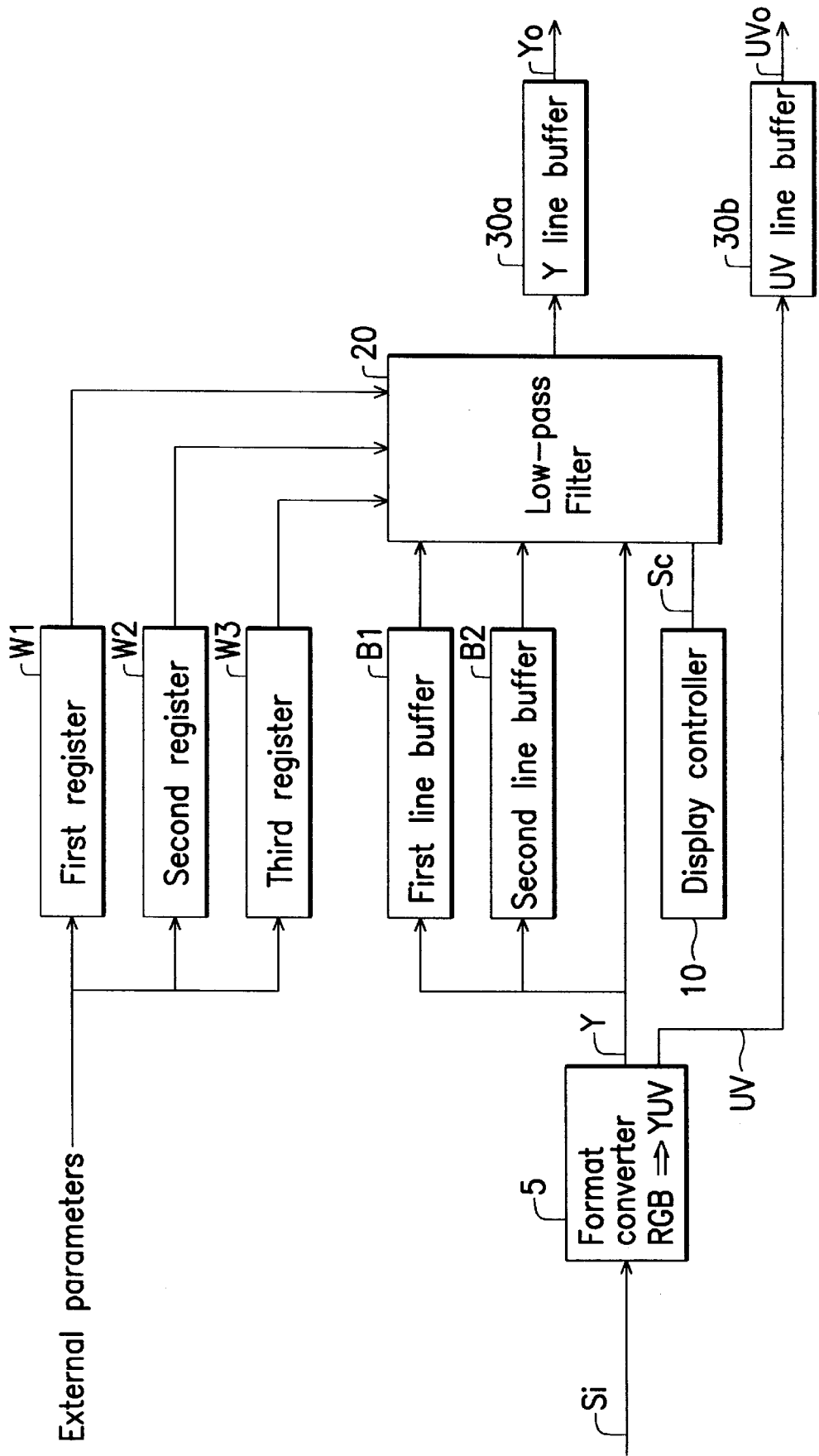
FIG. 2 shows a block diagram of the converting apparatus according to the embodiment of the present invention.

FIG. 2 shows a block diagram of the converting apparatus according to the embodiment of the present invention. The converting apparatus comprises a receiving means 5, a display controller 10, a first line buffer B1, a second line buffer B2, a first register W1, a second register W2, a third register W3, a low-pass filter 20, a Y line buffer 30a and a UV line buffer 30b.

The receiving means 5, for example the format converter in FIG. 2, is used to convert the input RGB non-interlaced computer graphics signal Si to output a YUV format non-interlaced computer graphics horizontal scan line having a Y-signal (that is, the brightness signal) and a UV-signal.

The display controller 10 then provides a display control signal Sc to indicate whether the UV-signal is stored in the UV line buffer 30b. When the display control signal Sc indicates an even field, the UV-signal of even horizontal scan lines obtained from the format converter 5 is stored in the UV line buffer 30b. On the other hand, when the display control signal Sc indicates odd field, the UV-signal of odd horizontal scan lines obtained from the format converter 5 is stored in the UV line buffer 30b.

The low-pass filter 20 is provided to eliminate flicker. It sequentially receives the brightness signals of the received horizontal scan line and several adjacent horizontal scan lines according to the display control signal Sc. Then, the brightness signals (in YUV format, the brightness signal is represented by Y-signal as an 8-bit value) are weighted according to a weighing ratio (such as 1:2:1 or 1:1:1 ) to obtain a weighted brightness signal Y storing in the Y line buffer 30a. The Y line buffer 30a and the UV line buffer 30b are used to halve the refresh rate (30 frames per second in the NTSC standard or 25 frames per second in the PAL standard) and output the second horizontal scan line before the received horizontal scan line (including Y0 signal and UV0 signals as shown in FIG. 2) to alternately serve as the odd field and the even field of the interlaced video signal.

Further, in this embodiment, the brightness signals of the first horizontal scan line and the second horizontal scan lines before the received horizontal scan line can be respectively stored in the first line buffer B1 and the second line buffer B2. And the first line buffer B1 and the second line buffer B2, because only storing the brightness signal (that is, Y-signal), can be memories with 8-bit buses. The weighting ratio corresponding to the brightness signals of the received horizontal scan line and the adjacent horizontal scan lines can be respectively stored in the first register WI, the second register W2 and the third register W3, and can be 1:1:1 or 1:2:1.

What follows is a formula for converting a frame of the non-interlaced computer graphics signal into an even field of the interlaced video signal.

The brightness of the even field $$\underline{Y}(x,0)=(Y(x,0)*W1+Y(x,0)*W2+Y(x,1)*W3)/(W1+W2+W3)$$

$$\underline{Y}(x,\underline{n})=(Y(x,2\underline{n}-1)*W1+Y(x,2\underline{n})*W2+Y(x,2\underline{n}+1)*W3)/(W1+W2+W3)$$

$$1<=\underline{n}<=n/2-1$$

Wherein, n is the number of horizontal scan lines in a frame of the non-interlaced computer graphics signal;

Y is the brightness signal in the frame of the non-interlaced computer graphics signal; and X is the brightness signal in the even field of the interlaced computer graphics signal.

In this embodiment, the brightness signal X(x,0) of the first horizontal scan line in the even field is obtained by weighting the brightness signal Y(x,0) of the first horizontal scan line twice and the brightness signal Y(x,1) of the second horizontal scan line once according to the weighting ratio stored in the first register W1, the second register W2 and the third register W3.

The brightness signal of the odd field $$\underline{Y}(x,\underline{n})=(Y(x,2\underline{n})*W1+Y(x,2\underline{n}+1)*W2+Y(x,2\underline{n}+2)*W3)/(W1+W2+W3)$$

$$0<=\underline{n}<=/2-2$$

$$\underline{Y}(x,n/2-1)=(Y(x,n-2)*W1+Y(x,n-1)*W2+Y(x,n-1)*W3)/(W1+W2+W3)$$

Wherein, n is the number of horizontal scan lines in a frame of the non-interlaced computer graphics signal;

Y is the brightness signal in the frame of the noninterlaced computer graphics signal; and Y is the brightness signal in the odd field of the interlaced video signal.

In this embodiment, the brightness signal Y(x,n/2−1) of the last horizontal scan line in the odd field is obtained by weighting the brightness signal Y(x,n−1) of the last horizontal scan line twice and the brightness signal Y(x,n−2) of the second horizontal scan line before the last horizontal scan line once according to the weighting ratio stored in the first register W1, the second register W2 and the third register W3.

In summary, a low-pass filter is provided in the converting apparatus and method of the present invention to receive and weight the brightness signals of the input non-interlaced computer graphics horizontal scan lines, and alternately output the weighted horizontal scan lines to serve as the even fields and the odd fields of the interlaced video signal used for video applications, and thus eliminating flicker.

In addition, a first line buffer B1 and a second line buffer B2 are provided in the converting apparatus and method of the present invention to store the brightness signals of the adjacent horizontal scan lines(the first and the second horizontal scan lines before the received horizontal scan line). Furthermore, since the line buffer only handles the brightness signals, it can be shortened to an 8-bit bus memory. In addition, the weighting ratio corresponding to the brightness signals of the received horizontal scan line and the adjacent horizontal scan lines are respectively stored in the first register W1, the second register W2 and the third register W3, and can be modified for various occasions.

The foregoing description of a preferred embodiment of the present invention has been provided for the purposes of illustration and description only. It is not intended to be exhaustive or to limit the invention to the precise forms disclosed. Many modifications and variations will be apparent to practitioners skilled in this art. The embodiment was chosen and described to best explain the principles of the present invention and its practical application, thereby enabling those who are skilled in the art to understand the invention for various embodiments and with various modifications as are suited to the particular use contemplated. It is intended that the scope of the invention be defined by the following claims and their equivalents.

What is claimed is:

1. An apparatus for converting a non-interlaced color computer graphics signal into an interlaced color video signal, wherein the non-interlaced computer graphics signal consists of a plurality of contiguous scan lines, and the interlaced video signal alternately consists of a plurality of odd fields and even fields, comprising:

a receiving means for sequentially receiving a scan line;

four or less line buffers storing brightness signals of a plurality of adjacent scan lines before the received scan line; and a low-pass filter receiving the brightness signals of the adjacent scan lines of the received scan line from the line buffers and the received scan line from the receiving means, only weighting the brightness signals of these scan lines, and alternately outputting the scan lines with the weighted brightness signal and a halved refresh rate to serve as the even field and the odd field of the interlaced video signal.

2. The converting apparatus as claimed in claim 1, wherein the adjacent scan lines are the first scan line and the second scan line before the received scan line.

3. The converting apparatus as claimed in claim 2, wherein the weighting ratio is stored in a plurality of registers.

4. The converting apparatus as claimed in claim 2, wherein the weighting ratio is 1:2:1 or 1:1:1.

5. The converting apparatus as claimed in claim 2, wherein the non-interlaced computer graphics signal is RGB format, which is converted into a YUV format non-interlaced computer graphics signal with the Y-signal representing brightness before being sent to the line buffer and the low-pass filter.

6. The converting apparatus as claimed in claim 2, wherein the line buffer is a memory with an 8-bit bus.

7. A method for converting a non-interlaced color computer graphics signal into an interlaced color video signal, wherein the non-interlaced computer graphics signal consists of a plurality of contiguous scan lines, and the interlaced video signal alternately consists of a plurality of odd fields and even fields, comprising:

sequentially receiving a scan line;

providing four or less line buffers storing the brightness signals of a plurality of adjacent scan lines before the received scan line; and receiving the brightness signals of the adjacent scan lines from the line buffers and the received scan line, weighting the brightness signal of these scan lines, and alternately outputting the scan lines with the weighted brightness signal and a halved refresh rate to serve as the even field and the off field of the interlaced video signal.

8. The converting method as claimed in claim 7, wherein the adjacent scan lines are the first scan line and the second scan line before the received scan line.

9. The converting method as claimed in claim 8, wherein the display control signal is provided by a display controller.

10. The converting method as claimed in claim 8, wherein the weighting ratio is stored in a plurality of registers.

11. The converting method as claimed in claim 8, wherein the weighting ratio is 1:2:1 or 1:1:1.

12. The converting apparatus as claimed in claim 8, wherein the non-interlaced computer graphics signal is RGB format, which is converted to a YUV format non-interlaced computer graphics signal with the Y-signal representing brightness before being sent to the line buffer and the low-pass filter.

13. The converting apparatus as claimed in claim 8, wherein the line buffer is a memory with an 8-bit bus.

* * * * *